April 10, 1928.
W. J. FOSTER
1,665,953
SHADE CORD HOLDER
Filed June 21, 1927
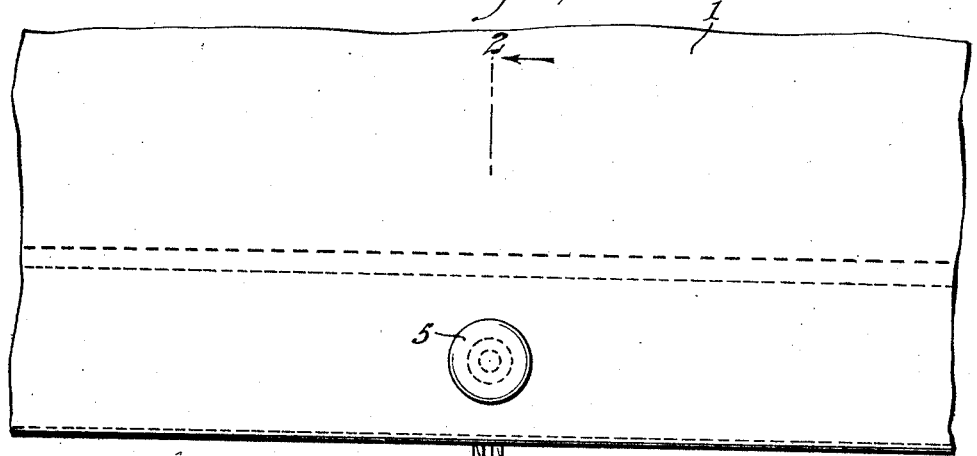
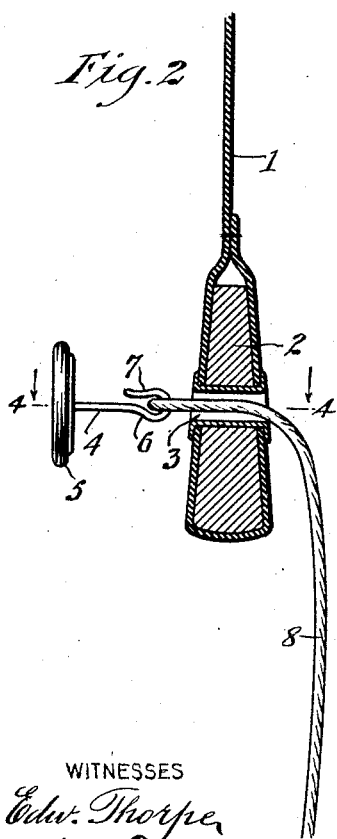
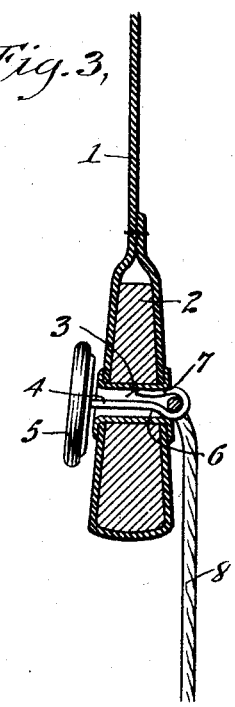
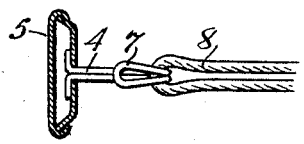
WITNESSES
Edw. Thorpe
S.W. Foster
INVENTOR
Wm. J. Foster
BY
ATTORNEY Patented Apr. 10, 1928.

1,665,953

UNITED STATES PATENT OFFICE.

WILLIAM J. FOSTER, OF JERSEY CITY, NEW JERSEY.

SHADE-CORD HOLDER.

Application filed June 21, 1927. Serial No. 200,398.

This invention relates to shade cord holders, an object of the invention being to provide a device which permits coupling engagement of a shade cord with the shade without the necessity of knotting or tying the cord, and which presents a neat and attractive appearance and greatly facilitates the attachment of the cord to the shade.

A further object is to provide a device of this character which is in the nature of a button carrying a hook. The latter after it has received the loop of the shade cord is drawn into an opening or eyelet and snaps into place, preventing the liability of the button and hook breaking loose.

A further object is to provide a device of this character which can be produced at an extremely low cost, which will be neat and attractive in appearance and which will simplify and facilitate the attachment or detachment of the cord of a shade.

With these and other objects in view, the invention consists in certain novel features of construction and combinations and arrangements of parts which will be more fully hereinafter described and pointed out in the claims.

In the accompanying drawings—

Figure 1 is a fragmentary view in front elevation illustrating my improved device in operative position on a shade;

Figure 2 is a view in section on the line 2—3 of Figure 1, showing the position of the parts in the act of assemblage;

Figure 3 is a view similar to Figure 2, showing the parts completely assembled;

Figure 4 is a sectional plan view of my improved device, the view being taken on the line 4—4 of Figure 2 but the shade is omitted.

1 represents a shade and 2 a stick with which a shade is ordinarily provided, and the material of the shade is positioned around the stick 2 and secured, as clearly indicated in Figures 2 and 3 of the drawings. 3 represents an eyelet which is projected through the stick and through the thicknesses of the shade and upset at its ends so as to provide an opening for the hook shank 4 of a button 5.

This button 5 may take any desired shape, be of any desired size and ornamented in any desired way, but it is of course larger in diameter than the opening provided by the eyelet.

The hook shank 4 is preferably wire although it may be made of other material, and is bent or curved upon itself so as to provide a pair of curved or rounded shoulders 6 and 7, spaced slightly from the free end of the hook, so that when the shaft 4 is projected into the eyelet, the hook or rather the bent or curved end of the hook shank will snap into place. That is to say, it will be slightly compressed by its movement through the eyelet and then will expand as it reaches the end of the eyelet, and the curved shoulders 6 and 7 above referred to will engage the end of the eyelet with sufficient force to hold the button in place and prevent it from falling out by gravity.

8 represents an ordinary cord. This cord is looped or may have any form of loop at its ends to receive the hook shank 4.

In operation, the cord is projected through the eyelet and then the hook of the shank is engaged with the loop and drawn into the eyelet to take a holding position. When the hook is in the eyelet the cord cannot be pulled off of the end of the hook as the hook is effectually closed by its position in the eyelet, and while I have exaggerated to some extent the position of the hook in Figure 3 it is of course to be understood that the parts will be properly proportioned so as to make a neat and attractive appearance without projecting the hook beyond the shade any more than is absolutely necessary.

While I have illustrated what I believe to be a preferred embodiment of my invention, it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A shade cord holder, comprising a cord-carrying hook adapted to be positioned in an opening in a shade and its stick and said hook when in the opening preventing the cord from being disengaged therefrom and having an enlargement at its end to limit the movement of the hook in one direction in said opening.

2. In a shade having a stick therein, the stick and shade having an eyeleted opening, a cord-carrying hook having an enlargement at its end, said hook being resilient and adapted to be positioned in the said opening with the enlargement overlying the opening at one side of the shade, said hook when in the eyeleted opening preventing the cord from being disengaged therefrom.

3. In a shade having a stick therein, the shade and stick having an opening and an eyelet in the opening, a button having a shank terminating in a spring hook, said hook being adapted to be positioned in the eyelet with the button overlying one end of the eyelet, said hook adapted to be compressed by its movement through the eyelet and to expand or snap into holding position with the other end of the eyelet.

4. A shade cord holder comprising a button having a shank formed with a spring hook at its end, said hook having rounded shoulders, whereby when the hook is positioned in an eyeleted opening of a shade, the shoulders of the hook will engage one end of the said opening and the button will overlie the other end of the opening.

5. A shade cord holder, comprising a button having a shank provided at its end with a cord-carrying member adapted to be positioned in an eyeleted opening of a shade, and when so positioned the shank to be held in the opening by the cord-carrying member engaging one end of the opening and the button engaging the other end of said opening.

6. In a shade cord holder, the combination, with a shade and its stick, and an eyelet located in an opening in said shade and said stick, of a button having a shank terminating in a hook, the shank and hook being positioned in the eyelet with the end of the hook engaging one end of the eyelet and the button overlying the other end of said eyelet.

WILLIAM J. FOSTER.